(12) United States Patent
Tsai et al.

(10) Patent No.: US 12,093,405 B2
(45) Date of Patent: Sep. 17, 2024

(54) METHOD AND SYSTEM FOR AUTOMATICALLY LOADING PARAMETERS, AND CLIENT-END SERVER THEREOF

(71) Applicant: Hiwin Technologies Corp., Taichung (TW)

(72) Inventors: Shang-Hua Tsai, Taichung (TW); Chi-Lun Cheng, Taichung (TW); Cheng-Fu Chou, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 370 days.

(21) Appl. No.: 17/650,900

(22) Filed: Feb. 14, 2022

(65) Prior Publication Data

US 2023/0259639 A1    Aug. 17, 2023

(51) Int. Cl.
*G06F 21/60*    (2013.01)

(52) U.S. Cl.
CPC .... *G06F 21/602* (2013.01); *G06F 2221/2107* (2013.01)

(58) Field of Classification Search
CPC .......... G06F 21/602; G06F 2221/2107; G06F 21/6209
See application file for complete search history.

(56) References Cited

U.S. PATENT DOCUMENTS

| | | | |
|---|---|---|---|
| 7,349,555 B2 * | 3/2008 | Rhoads | G07F 7/08 382/280 |
| 7,570,641 B2 | 8/2009 | Snyder | |
| 2007/0182982 A1 | 8/2007 | Hayashida et al. | |
| 2008/0177994 A1 * | 7/2008 | Mayer | G06F 16/00 709/224 |
| 2008/0285793 A1 * | 11/2008 | Shi | G06T 1/0028 382/100 |
| 2018/0349895 A1 | 12/2018 | Ericson | |
| 2023/0144092 A1 * | 5/2023 | Pierce | H04L 9/3247 726/26 |

FOREIGN PATENT DOCUMENTS

| | | |
|---|---|---|
| CN | 110087098 A | 8/2019 |
| CN | 111767552 A | 10/2020 |
| CN | 111882332 A | 11/2020 |
| CN | 113420304 A | 9/2021 |
| JP | 2007221747 A | 8/2007 |
| JP | 2010154031 A | 7/2010 |
| TW | I281617 B | 5/2007 |
| TW | I385554 B | 2/2013 |
| TW | I439135 B | 5/2014 |
| TW | I600492 B | 10/2017 |

* cited by examiner

*Primary Examiner* — Sm A Rahman

(74) *Attorney, Agent, or Firm* — Wang Law Firm, Inc.

(57) ABSTRACT

A method and a system for automatically loading parameters, and a client-end server thereof are provided, and the method and the system, by a reversible information hiding technology, entrain various required parameters in an engineering drawing hiddenly to generate an encrypted file; and then, after decrypting the encrypted file by a pre-stored cipher key, obtain and automatically load the required parameters. Therefore, the parameters can be automatically loaded quickly, accurately and safely.

7 Claims, 5 Drawing Sheets

41(4)

| SPEC.: 4R55-50S4-QFSH-520-690-0.05 | | | PRELOAD(kgf) | 48.688 |
|---|---|---|---|---|
| MAX. AXIAL LOAD (kgf) | 3000 | | R.D. | — |
| MAX. ROTATION SPEED (rpm) | 72000 | | S.F. (kgf) | — |
| DN VALUE | 50 | | DRAG TORQUE(kgf·cm) | — |
| MAX. FEED RATE (m/min) | 4.9 | LUBRICATION | DIRECTION OF TURN | R |
| ACCELERATION (m/sec²) | | SPACE BALL | P.C. DIA. | 57.2 |
| SUPPORT METHOD | FIXED-FIXED | CT TYPE ASSEMBLY METHOD | BALL DIA. | 7.938 |
| | | CUSTOMER DRAWING NO. | BACKLASH | 0.01 |
| | | CUSTOMER M/C TYPE | CIRCUIT | 1.8*5 |
| | | CUSTOMER AXIAL TYPE | LEAD ANGLE | 15.65 |
| | | | DYNAMIC (kgf) | 11810 |
| | | Y | STATIC (kgf) | 39710 |
| | | | LEAD | 50/12.5 |

| | | | MAT. | SH-315N4 NTSWT75 | DATE | 2021.12.01 |
|---|---|---|---|---|---|---|
| | | | THREAD BALL TRACK HRC 60~70 | | DWG | YYY |
| | | | | | CHK | ZZZ |
| | | | CUSTR | | APPD | WWW |
| | | | DWG.NO. | | | XXX 1234567 |

Health Diagnosis System Settings

| | 4R55-50S4-QFSH-520-690-0.05 | | |
|---|---|---|---|
| Specification number | Lead angle | | |
| Root diameter | Dynamic load (kgf) | | |
| Direction of turn | Static load (kgf) | | |
| Pitch diameter | Lead/pitch | | |
| Steel ball diameter | Circuit | | |
| Backlash | | | |

FIG.4

Health Diagnosis System Settings

| Specification number | 4R55-50S4-QFSH-520-690-0.05 | | |
|---|---|---|---|
| Root diameter | 48.688 | Lead angle | 15.65 |
| Direction of turn | R | Dynamic load (kgf) | 11810 |
| Pitch diameter | 57.2 | Static load (kgf) | 39710 |
| Steel ball diameter | 7.938 | Lead/pitch | 50/12.5 |
| Backlash | 0.01 | Circuit | 1.8*5 |

FIG.5

METHOD AND SYSTEM FOR AUTOMATICALLY LOADING PARAMETERS, AND CLIENT-END SERVER THEREOF

BACKGROUND OF THE INVENTION

Field of Invention

The invention relates to an information technology, and more particularly to a method and a system for automatically loading parameters, and a client-end server thereof.

Description of Related Art

Because the process of manually inputting information is complicated and easy to make mistakes, it is gradually replaced by automatic information loading technology. Existing ways to automatically load information include scanning barcodes (such as patent TWI600492), installing configuration files, and image recognition (such as patent CN111882332A). However, scanning barcodes requires creating barcodes additionally, installing barcode scanner (or electronic device with camera lens) and connecting to the network, and it is not suitable for environments where external networks cannot be connected or electronic devices with camera lens cannot be used; installation of configuration files has the problem of complicated operation and easy to leak confidential information; image recognition is prone to make errors in distinguishing and requires huge operational resources.

Other related technologies of adding watermarks to pictures are disclosed in U.S. Pat. No. 7,570,641, CN110087098A, TWI281617 and TWI439135.

SUMMARY OF THE INVENTION

In view of the above-mentioned problems, one object of the invention is to provide a method and a system for automatically loading parameters, and a client-end server thereof, and the invention is capable of saving time and manpower for manually inputting parameters, and capable of avoiding manual keying errors.

Another object of the invention is to provide a method and a system for automatically loading parameters, and a client-end server thereof, and the invention is capable of avoiding leakage of confidential information.

Yet another object of the invention is to provide a method and a system for automatically loading parameters, and a client-end server thereof, and the invention enables that client-end users only need to easily load files and then the required parameters are quickly and automatically filled in corresponding fields to be loaded.

Yet another object of the invention is to provide a method and a system for automatically loading parameters, and a client-end server thereof, and the invention is capable of benefitting client-end users by saving the costs of installing additional devices (such as but are not limited to barcode scanners) and by saving the time of installing configuration files.

Yet another object of the invention is to provide a method and a system for automatically loading parameters, and a client-end server thereof, and the invention is suitable for use in independent network environments.

In order to achieve the above and other objects, according to one embodiment, the invention provides a method for automatically loading parameters, and the method includes following steps of: (A) encrypting and encoding information to be loaded into hidden information, and the information to be loaded including at least one specification parameter; (B) writing the hidden information into an engineering drawing hiddenly by a reversible information hiding procedure to generate an encrypted file; (C) extracting the hidden information from the encrypted file by a pixel decoding procedure; (D) decrypting the hidden information into the information to be loaded; and (E) automatically loading the at least one specification parameter of the information to be loaded into at least one field to be loaded.

In some embodiments, the step (A) is performed through an encryption encoder, the step (B) is performed through an image encoder, the step (C) is performed through an image decoder, the step (D) is performed through a decryption decoder, and the step (E) is performed through a parameter loader.

In some embodiments, the information to be loaded further includes a set of plain codes and a set of secret codes, the set of plain codes includes the at least one specification parameter and at least one specification index, the specification index corresponds to the specification parameter and directs to the field to be loaded, the set of secret codes includes at least one algorithmic parameter, and the method further includes a following step: (F) by the parameter loader, obtaining the algorithmic parameter from the decryption decoder, and automatically loading the algorithmic parameter into a database.

In some embodiments, in the step (A), the information to be loaded is encrypted and encoded with a first cipher key into the hidden information through the encryption encoder; and in the step (D), the hidden information is decrypted with a second cipher key into the information to be loaded through the decryption decoder, and the second cipher key corresponds to the first cipher key.

In some embodiments, the reversible information hiding procedure is least significant bit-based visual information hiding technology, most significant bit-based visual information hiding technology, fast Fourier transform hiding technology, or discrete wavelet transform hiding technology.

In some embodiments, the step (A) includes following steps of: (A1) encrypting the set of secret codes into a set of garbled codes; and (A2) converting the set of plain codes and the set of garbled codes into a first binary bit code sequence as the hidden information; and the step (B) includes following steps of: (B1) converting each of pixel values of the engineering drawing into a second binary bit code sequence; and (B2) adding the first bit code sequence to the second bit code sequences to generate the encrypted file.

In some embodiments, in the step (C), the set of plain codes and the set of garbled codes are acquired from the encrypted file; and in the step (D), the set of garbled codes is decrypted into the set of secret codes by the second cipher key.

According to one embodiment, the invention further provides a system for automatically loading parameters, and the system includes: a server-end server with a first cipher key, information to be loaded and an engineering drawing therein, the information to be loaded including at least one specification parameter, and the server-end server including: an encryption encoder for encrypting and encoding the information to be loaded into hidden information; and an image encoder for obtaining the hidden information from the encryption encoder, and writing the hidden information into the engineering drawing hiddenly by a reversible information hiding procedure to generate and output an encrypted file; and a client-end server with a second cipher key therein corresponding to the first cipher key, and the client-end server including: an image decoder for extracting the hidden information from the encrypted file through a pixel decoding procedure; a decryption decoder for obtaining the hidden information from the image decoder, and decrypting the hidden information into the information to be loaded by the second cipher key; a user interface including at least one field to be loaded, and the field to be loaded corresponding to the at least one specification parameter; and a parameter loader for obtaining the information to be loaded from the decryption decoder, and automatically loading the at least one specification parameter of the information to be loaded into the at least one field to be loaded of the user interface.

According to one embodiment, the invention further provides a server-end server suitable for being set up in a system for automatically loading parameters, the server-end server has information to be loaded and an engineering drawing therein, the information to be loaded includes at least one specification parameter, and the server-end server includes: an encryption encoder for encrypting and encoding the information to be loaded into hidden information; and an image encoder for obtaining the hidden information from the encryption encoder, and writing the hidden information into the engineering drawing hiddenly by a reversible information hiding procedure to generate an encrypted file.

According to one embodiment, the invention further provides a client-end server suitable for being set up in a system for automatically loading parameters, the system includes a server-end server communicable with the client-end server, the server-end server provides an encrypted file and stores a first cipher key, and the client-end server stores a second cipher key corresponding to the first cipher key, and includes: an image decoder for extracting hidden information from the encrypted file by a pixel decoding procedure; a decryption decoder for obtaining the hidden information from the image decoder, and decrypting the hidden information into information to be loaded by the second cipher key; a user interface including at least one field to be loaded, and the field to be loaded corresponding to at least one specification parameter in the information to be loaded; and a parameter loader for obtaining the information to be loaded from the decryption decoder, and automatically loading the at least one specification parameter of the information to be loaded into the at least one field to be loaded of the user interface.

BRIEF DESCRIPTION OF THE DRAWINGS

After studying the detailed description in conjunction with the following drawings, other aspects and advantages of the invention will be discovered:

FIG. 3 is a schematic diagram of a specification description (or title block) of an engineering drawing that is related to a ball screw and will be provided to a client end, in one embodiment of the invention;

FIG. 4 is a schematic diagram of a user interface for filling in information according to one embodiment of the invention; and FIG. 5 is a schematic diagram of the user interface filled with information according to one embodiment of the invention.

DETAILED DESCRIPTION OF THE INVENTION

In the following detailed description, many specific details are set forth in order to provide a thorough understanding of the invention. However, those of ordinary skill in the art will understand that the invention can be practiced without the specific details. In other cases, well-known methods, procedures and/or elements have not been described in detail so as not to obscure the invention.

Figure 1:
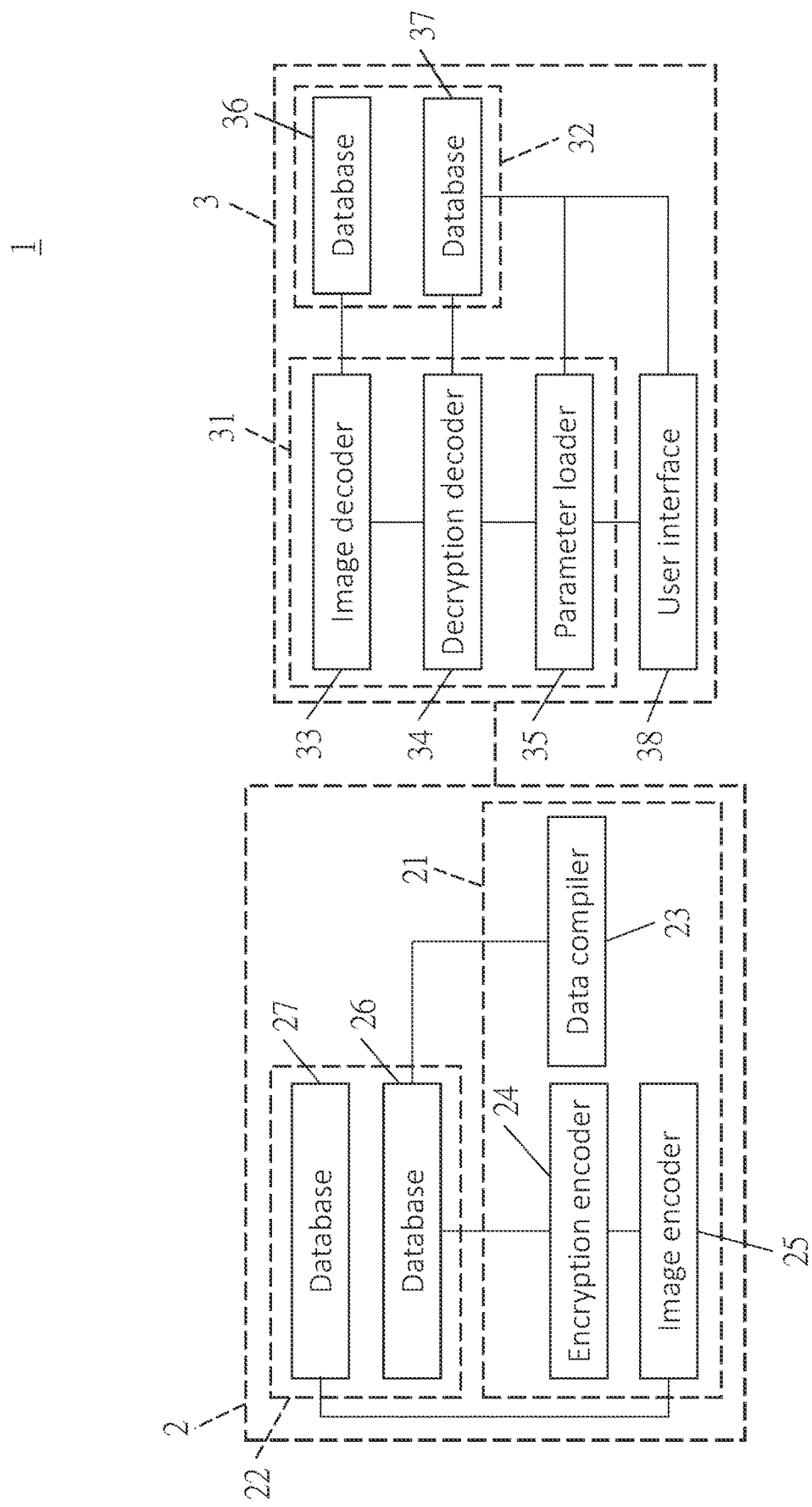
FIG. 1 is a functional block diagram of a system for automatically loading parameters according to one embodiment of the invention.
Figure 2:
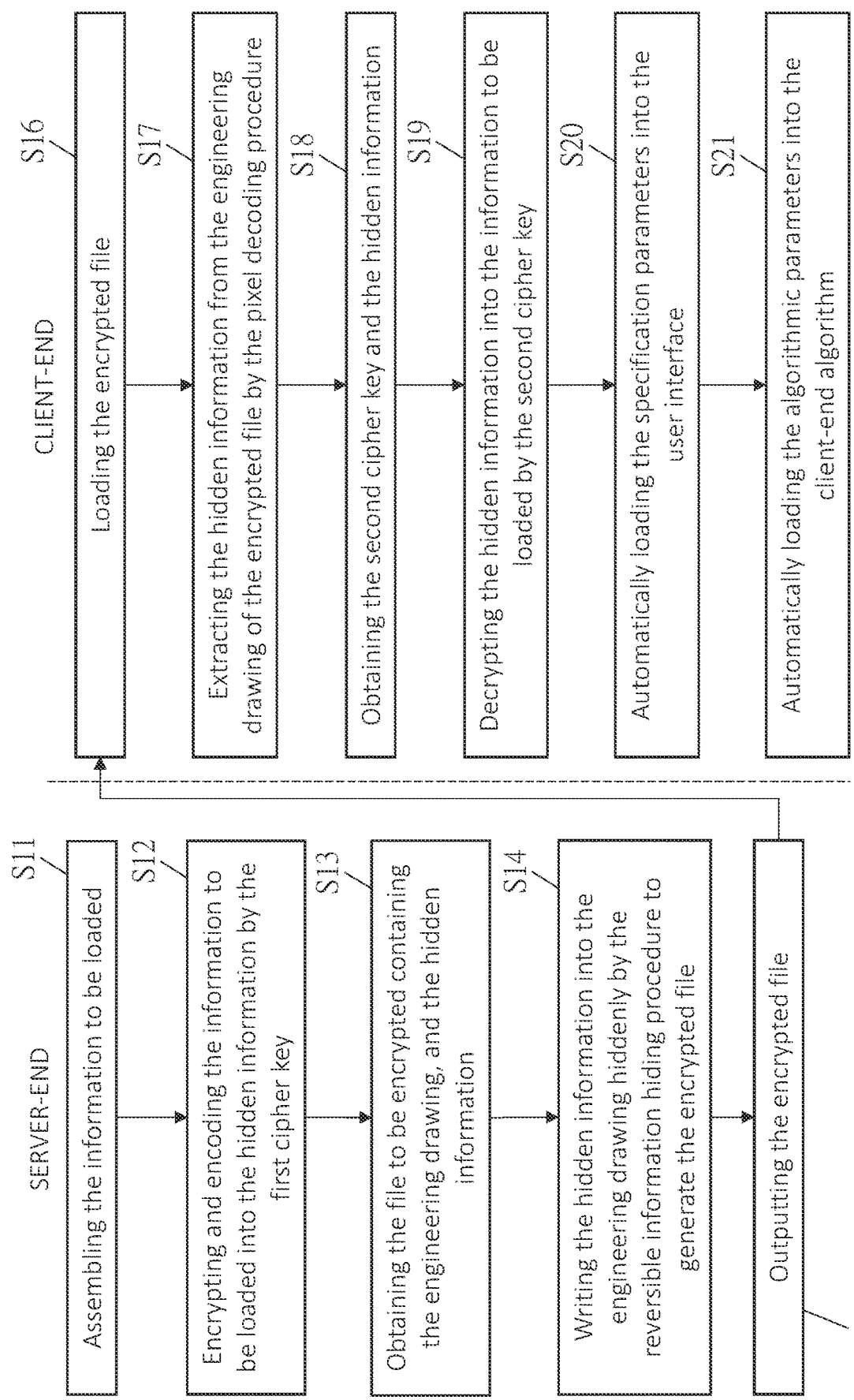
FIG. 2 is a flowchart of a method for automatically loading parameters according to one embodiment of the invention.

Please refer to FIGS. 1 and 2 for a system 1 for automatically loading parameters (hereinafter referred to as system 1) according to one embodiment of the invention capable of executing a method for automatically loading parameters (hereinafter referred to as loading method) provided by one embodiment of the invention to remotely assist in automatically loading parameters into a health diagnosis system of a linear transmission device to enable the health diagnosis system to operate according to the loaded parameters. In addition, the loading method provided by the embodiment of the invention is also capable of assisting in automatically loading parameters into a machine control system to enable the machine control system to operate according to the loaded parameters.

The system 1 includes a server-end server 2, and the server-end server 2 includes a processor 21 and a storage device 22 that can be accessed by the processor 21. The processor 21 can be configured in operation to include, for example, but not limited to, a data compiler 23, an encryption encoder 24, and an image encoder 25, and the encryption encoder 24 is capable of communicating with the image encoder 25. The storage device 22 can be configured in operation to include, for example, but not limited to, a database 26 and a database 27. The data compiler 23 and the encryption encoder 24 are capable of communicating with the database 26, and the image encoder 25 is capable of communicating with the database 27.

The system 1 further includes a client-end server 3. The client-end server 3 can servers as a part of the health diagnosis system or of the machine control system. The client-end server 3 includes a processor 31 and a storage device 32. The processor 31 can be configured in operation to include, for example, but not limited to, an image decoder 33, a decryption decoder 34, and a parameter loader 35. The decryption decoder 34 is capable of communicating with the image decoder 33 and the parameter loader 35 respectively. The storage device 32 can be configured in operation to include, for example, but not limited to, include a database 36 and a database 37. The image decoder 33 is capable of communicating with the database 36, and the decryption decoder 34 and the parameter loader 35 are capable of communicating with the database 37. The client-end server 3 further includes a user interface 38 capable of communicating with the parameter loader 35 and the database 37. The database 37 can store, for example, but not limited to, different software applications. The different software applications can include, for example, but not limited to, a diagnostic software application of the health diagnosis system, and the diagnostic software application provides the user interface 38, so a client-end algorithm of the diagnostic software application is capable of linking to the user interface 38.

The loading method is exemplarily described below. The loading method includes the following steps.

Firstly, in step S11, the data compiler 23 of the server-end server 2 compiles a piece of information to be loaded by assembling one or more pieces of collected data to be loaded and stores the information to be loaded in the database 26. The information to be loaded is a set of data sequences, including a set of plain codes and a set of secret codes. A content of the set of plain codes is non-confidential data which the client-end is allowed to see and includes specification parameters and specification indices corresponding to the specification parameters, and the specification indices direct to fields to be loaded 381 on the user interface 38, as shown in FIG. 4. The set of secret codes is confidential data that is not allowed to be seen by the client-end and includes algorithmic parameters. For example, as shown in FIG. 3, a drawing description 41 (i.e., title block) of an engineering drawing 4 that is related to a ball screw and is to be provided to the client end, includes various specification items 42 and a specification content 43 of each of the specification items 42. In this example, when it is required to input the contents in specification requirement areas 44 of the drawing description 41 into the user interface 38, through the data compiler 23 a staff of the server end can obtain the various specification items 42 and their specification contents 43 in the specification requirement areas 44 from a central control database (not shown in the figure) linked to the server-end server 2. And, when it is required for the server end to provide one or more algorithmic parameters (such as but not limited to the Poisson's ratio and density of the material of a ball screw and the groove factor of the ball screw) for a client-end algorithm of a diagnostic software application to use, the staff of the server end can also obtain the one or more algorithmic parameters from the central control database through the data compiler 23. Then, the data compiler 23 assembles the acquired data into a set of data sequences in the JSON (JavaScript Object Notation) data format and stores the set of data sequences in the database 26. The set of data sequences includes a set of plain codes constituted by the obtained specification items 42 (i.e., specification indices) and their specification contents 43 (i.e., specification parameters), and a set of secret codes constituted by the obtained algorithmic parameters.

Then, in step S12, the encryption encoder 24 obtains the information to be loaded from the database 26, and encrypts and encodes the information to be loaded into a piece of hidden information according to a first cipher key. Specifically, the encryption encoder 24 first encrypts the set of secret codes of the information to be loaded in a manner, such as but not limited to symmetric encryption, to form a set of garbled codes; and then, converts the set of plain codes and the set of garbled codes into a first binary bit code sequence as the hidden information.

Then, the image encoder 25 obtains the hidden information from the encryption encoder 24 and a file to be encrypted, containing the engineering drawing 4, from the database 27 in step S13, and then in step S14, further writes the hidden information into pixels of the engineering drawing 4 hiddenly by a reversible information hiding procedure to generate an encrypted file. Taking the first binary bit code sequence as an example of the hidden information to illustrate the way of writing the hidden information into the pixels of the engineering drawing 4 hiddenly. In this case, firstly, converting each of pixel values of the engineering drawing 4 into a second binary bit code sequence; and then, adding the first bit code sequence to the second bit code sequences of the engineering drawing 4 to generate the encrypted file. The reversible information hiding procedure can use, for example, but not be limited to, least significant bit-based visual information hiding technology, most significant bit-based visual information hiding technology, fast Fourier transform hiding technology, discrete wavelet transform hiding technology, or other reversible steganography manners. At this time, the information to be loaded has been entrained hiddenly or concealed in the engineering drawing of the encrypted file. Therefore, the engineering drawing of the encrypted file is almost the same as the engineering drawing 4, and the difference therebetween cannot be recognized by the naked eye. A file format of the file to be encrypted can be, for example, but not limited to, document file (such as but not limited to PDF) or image file (such as but not limited to JPG or PNG). A file format of the encrypted file can be, for example, but not limited to, document file (such as but not limited to PDF) or image file (such as but not limited to JPG or PNG).

After generating the encrypted file, the server-end server 2 exports or outputs the encrypted file in step S15. The encrypted file can be, for example, but not limited to, transmitted to the client-end through an external network (i.e., extranet), or provided to the client-end through a storage medium when stored in the storage medium.

After the server-end server 2 exports or outputs the encrypted file, the client-end server 3 loads the encrypted file in step S16, and then the image decoder 33 extracts the hidden information, i.e., the set of plain codes and the set of garbled codes, from the engineering drawing of the encrypted file by a pixel decoding procedure in step S17. After the hidden information is extracted from the engineering drawing of the encrypted file, the engineering drawing of the encrypted file is restored to the engineering drawing 4 and stored in the database 36.

Then, the decryption decoder 34 obtains a cipher key (i.e., a second cipher key) corresponding to the first cipher key from the database 37 and the hidden information from the image decoder 33 in step S18, and then in step S19, decrypts the hidden information into the information to be loaded by the second cipher key, that is, decrypts the set of garbled codes into the set of secret codes by the second cipher key. It is worth mentioning that in symmetric encryption, the second cipher key is the same as the first cipher key. If asymmetric encryption is used, either of the second cipher key and the first cipher key has a set of public key and private key. Reference for symmetric encryption and asymmetric encryption can be found in encryption techniques of the existing cryptography, and the description thereof will be omitted here.

Finally, the parameter loader 35 in step S20 obtains the set of plain codes from the decryption decoder 34, and then automatically loads the specification parameters corresponding to the specification indices into the corresponding fields to be loaded 381 in the user interface 38 according to the specification indices in the set of plain codes, as shown in FIG. 5. Moreover, the parameter loader 35 in step S21 obtains the set of secret codes from the decryption decoder 34 and then automatically loads the algorithmic parameters in the set of secret codes into the client-end algorithm of the health diagnosis system or of the machine control system.

In summary, the invention is capable of more efficiently and accurately completing the settings of the health diagnosis system (or other systems) by automatically loading the parameters into the user interface 38, and saving manpower consumption; and the invention is also capable of initializing the health diagnosis system (or other systems) by automatically loading the parameters into the algorithm. A client-end staff only needs to load the encrypted file, provided by the server-end, into the client-end server 3, and then, the client-end server 3 automatically completes the settings of the parameters required by the health diagnosis system (or other systems), thereby saving the time and costs of installing other devices (such as but not limited to barcode scanners) additionally, and also saving the time and manpower of installing configuration files that need complicated procedures for installation.

On the other hand, various non-confidential parameters and various confidential parameters that need to be set by the client end are entrained hiddenly in advance in the engineering drawing 4 that is predeterminedly nominated to be provided to the client end, through the reversible information hiding technology at the server end, and the engineering drawing of the encrypted file with the hidden information is visually the same as the engineering drawing 4, so confidential information will be kept confidential.

Moreover, since the cipher key required for decryption is pre-stored in the database 37 of the client-end server 3, the encrypted file must be decrypted on the client-end server 3. In other words, if the encrypted file is not decrypted on the client-end server 3, the encrypted file will not be successfully decrypted because there is no cipher key, thereby ensuring information security.

In addition, the server-end server 2 is capable of completing the hidden entrainment of data in the existing document file that has been appointed to be given to the client end, under its independent intranet environment, and the client-end server 3 is also capable of automatically completing the parameter settings under its independent intranet environment. Therefore, the system and the loading method of the invention are still capable of working even if the server-end server 2 or the client-end server 3 cannot connect to the extranet.

Although the specific embodiments of the invention are disclosed in the above implementation modes, they are not intended to limit the invention. The specification relating to the above embodiments should be construed as exemplary rather than as limitative of the invention, with many variations and modifications being readily attainable by a person having ordinary skill in the art to which the invention pertains without departing from the principles and spirit thereof as defined by the appended claims and their legal equivalents.

What is claimed is:

1. A method for automatically loading parameters, comprising following steps of:
   (A) through an encryption encoder, encrypting and encoding information to be loaded into hidden information, and the information to be loaded comprising at least one specification parameter;
   (B) through an image encoder, writing the hidden information into an engineering drawing hiddenly by a reversible information hiding procedure to generate an encrypted file;
   (C) through an image decoder, extracting the hidden information from the encrypted file by a pixel decoding procedure;
   (D) through a decryption decoder, decrypting the hidden information into the information to be loaded; and
   (E) through a parameter loader, automatically loading the at least one specification parameter of the information to be loaded into at least one field to be loaded,
   wherein the information to be loaded further comprises a set of plain codes and a set of secret codes, the set of plain codes comprises the at least one specification parameter and at least one specification index, the specification index corresponds to the specification parameter and directs to the field to be loaded, the set of secret codes comprises at least one algorithmic parameter, and the method for automatically loading the parameters further comprises a following step: (F) by the parameter loader, obtaining the algorithmic parameter from the decryption decoder, and automatically loading the algorithmic parameter into a database.

2. The method for automatically loading the parameters as claimed in claim 1, wherein in the step (A), the information to be loaded is encrypted and encoded with a first cipher key into the hidden information through the encryption encoder; and in the step (D), the hidden information is decrypted with a second cipher key into the information to be loaded through the decryption decoder, and the second cipher key corresponds to the first cipher key.

3. The method for automatically loading the parameters as claimed in claim 2, wherein the step (A) comprises following steps of:
   (A1) encrypting the set of secret codes to form a set of garbled codes; and
   (A2) converting the set of plain codes and the set of garbled codes into a first binary bit code sequence as the hidden information; and
   the step (B) comprises following steps of:
   (B1) converting each of pixel values of the engineering drawing into a second binary bit code sequence; and
   (B2) adding the first bit code sequence to the second bit code sequences to generate the encrypted file.

4. The method for automatically loading the parameters as claimed in claim 3, wherein in the step (C), the set of plain codes and the set of garbled codes are acquired from the encrypted file; and in the step (D), the set of garbled codes is decrypted into the set of secret codes by the second cipher key.

5. The method for automatically loading the parameters as claimed in claim 1, wherein the reversible information hiding procedure is least significant bit-based visual information hiding technology, most significant bit-based visual information hiding technology, fast Fourier transform hiding technology, or discrete wavelet transform hiding technology.

6. A system for automatically loading parameters, comprising:
   a server-end server with a first cipher key, information to be loaded and an engineering drawing therein, the information to be loaded comprising at least one specification parameter, and the server-end server comprising:
      an encryption encoder for encrypting and encoding the information to be loaded into hidden information; and
      an image encoder for obtaining the hidden information from the encryption encoder, and writing the hidden information into the engineering drawing hiddenly by a reversible information hiding procedure to generate and output an encrypted file; and
   a client-end server with a second cipher key therein corresponding to the first cipher key, and the client-end server comprising:
      an image decoder for extracting the hidden information from the encrypted file through a pixel decoding procedure;
      a decryption decoder for obtaining the hidden information from the image decoder, and decrypting the hidden information into the information to be loaded by the second cipher key;

a user interface comprising at least one field to be loaded, and the field to be loaded corresponding to the at least one specification parameter; and a parameter loader for obtaining the information to be loaded from the decryption decoder, and automatically loading the at least one specification parameter of the information to be loaded into the at least one field to be loaded of the user interface, wherein the information to be loaded further comprises a set of plain codes and a set of secret codes, the set of plain codes comprises the at least one specification parameter and at least one specification index, the specification index corresponds to the specification parameter and directs to the field to be loaded, the set of secret codes comprises at least one algorithmic parameter, and the parameter loader obtains the algorithmic parameter from the decryption decoder and automatically loads the algorithmic parameter into a database.

7. A client-end server suitable for being set up in a system for automatically loading parameters, the system comprising a server-end server communicable with the client-end server, the server-end server providing an encrypted file and storing a first cipher key, and the client-end server storing a second cipher key corresponding to the first cipher key, and comprising:

an image decoder for extracting hidden information from the encrypted file by a pixel decoding procedure;

a decryption decoder for obtaining the hidden information from the image decoder, and decrypting the hidden information into information to be loaded by the second cipher key;

a user interface comprising at least one field to be loaded, and the field to be loaded corresponding to at least one specification parameter in the information to be loaded; and a parameter loader for obtaining the information to be loaded from the decryption decoder, and automatically loading the at least one specification parameter of the information to be loaded into the at least one field to be loaded of the user interface, wherein the information to be loaded further comprises a set of plain codes and a set of secret codes, the set of plain codes comprises the at least one specification parameter and at least one specification index, the specification index corresponds to the specification parameter and directs to the field to be loaded, the set of secret codes comprises at least one algorithmic parameter, and the parameter loader obtains the algorithmic parameter from the decryption decoder and automatically loads the algorithmic parameter into a database.

* * * * *